United States Patent
Cho et al.

(10) Patent No.: US 7,121,334 B2
(45) Date of Patent: Oct. 17, 2006

(54) REFRIGERATOR AND CONTROL METHOD THEREOF

(75) Inventors: Sung-ho Cho, Kwangju (KR); Kyoung-tae Kim, Kwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 10/726,552

(22) Filed: Dec. 4, 2003

(65) Prior Publication Data

US 2004/0107714 A1 Jun. 10, 2004

Related U.S. Application Data

(62) Division of application No. 09/947,752, filed on Sep. 7, 2001, now Pat. No. 6,755,243.

(30) Foreign Application Priority Data

Mar. 26, 2001 (KR) ................ 15720/2001

(51) Int. Cl.
G05D 23/00 (2006.01)
F25D 11/00 (2006.01)
(52) U.S. Cl. .................. 165/289; 165/288; 62/440; 62/457.1
(58) Field of Classification Search ............. 165/288, 165/289; 62/115, 440, 129, 125, 132, 177, 62/186, 126, 231, 187, 228.1, 457.1; 99/468
See application file for complete search history.

(56) References Cited

U.S. PATENT DOCUMENTS

| 4,569,205 A | 2/1986 | Dempou et al. |
| 5,398,599 A | 3/1995 | Woo |
| 5,458,186 A | 10/1995 | Lee et al. |
| 6,327,867 B1 | 12/2001 | Hyodo et al. |

FOREIGN PATENT DOCUMENTS

| JP | 4-268182 | 9/1992 |
| JP | 7-110183 | 4/1995 |
| JP | 7-180951 | 7/1995 |
| JP | 7-246022 | 9/1995 |
| JP | 10-300319 | 11/1998 |
| KR | 1995-0010555 | 9/1995 |
| KR | 1996-0011626 | 8/1996 |
| KR | 96-0038331 | 11/1996 |
| KR | 0169616 | 10/1998 |
| KR | 1999-0032147 | 5/1999 |
| KR | 1999-0065128 | 8/1999 |
| KR | 20-0189350 | 5/2000 |
| KR | 2000-0040290 | 7/2000 |

*Primary Examiner*—Ljiljana Ciric
(74) *Attorney, Agent, or Firm*—Robert E. Bushnell, Esq.

(57) ABSTRACT

A refrigerator has at least one chamber, a temperature adjuster adjusting a temperature inside the chamber, a first temperature sensor approximately sensing the temperature inside the chamber, a second temperature sensor spaced from the first temperature sensor so as to sense the real temperature inside the chamber, and a controller controlling the temperature adjuster according to the temperature sensed by the second temperature sensor when the temperature sensed by the first temperature sensor is within predetermined temperature limits of the chamber and the temperature sensed by the second temperature sensor is not. With this configuration, the temperature inside the chamber is effectively controlled by an accurate and prompt sensing operation. Though one of the first and second temperature sensors is abnormal, it is possible to replace or repair the abnormal temperature sensor, or to control the temperature adjuster by the other normal temperature sensor.

22 Claims, 13 Drawing Sheets

REFRIGERATOR AND CONTROL METHOD THEREOF

CROSS-REFERENCE TO RELATED APPLICATIONS

This application is a divisional application of U.S. patent application Ser. No. 09/947,752 filed on 7 Sep. 2001 now U.S. Pat. No. 6,755,243. This related application is relied on and incorporated herein by references in its entirety.

CLAIM OF PRIORITY

This application makes reference to, incorporates the same herein, and claims all benefits accruing under 35 U.S.C. §119 and §120 from my applications entitled KIMCHI REFRIGERATOR AND CONTROL METHOD THEREOF filed with the Korean Industrial Property Office on 26 Mar. 2001 and there duly assigned Serial No. 2001-15720.

BACKGROUND OF THE INVENTION

1. Field of the Invention

The present invention relates in general to a refrigerator, and more particularly, to a refrigerator improved in the structure and the control method of a sensor sensing a temperature of a chamber thereof.

2. Description of the Related Art

Generally, a refrigerator is an apparatus which can maintain freshness of food by keeping a chamber at a predetermined cooling temperature, preventing the food from being spoiled. A kimchi refrigerator is also known as a kind of refrigerator, capable of exclusively preserving food such as kimchi, etc. requiring ripening and cooling.

Even if there are various kinds of refrigerators, they have a sensor sensing a temperature of a chamber and a controller controlling them based on the sensed temperature in common, in order to keep the chamber at a predetermined set up temperature.

Descriptions will be made hereinbelow with respect to a kimchi refrigerator equipped with the function of cooling and ripening by way of example.

Figure 7:
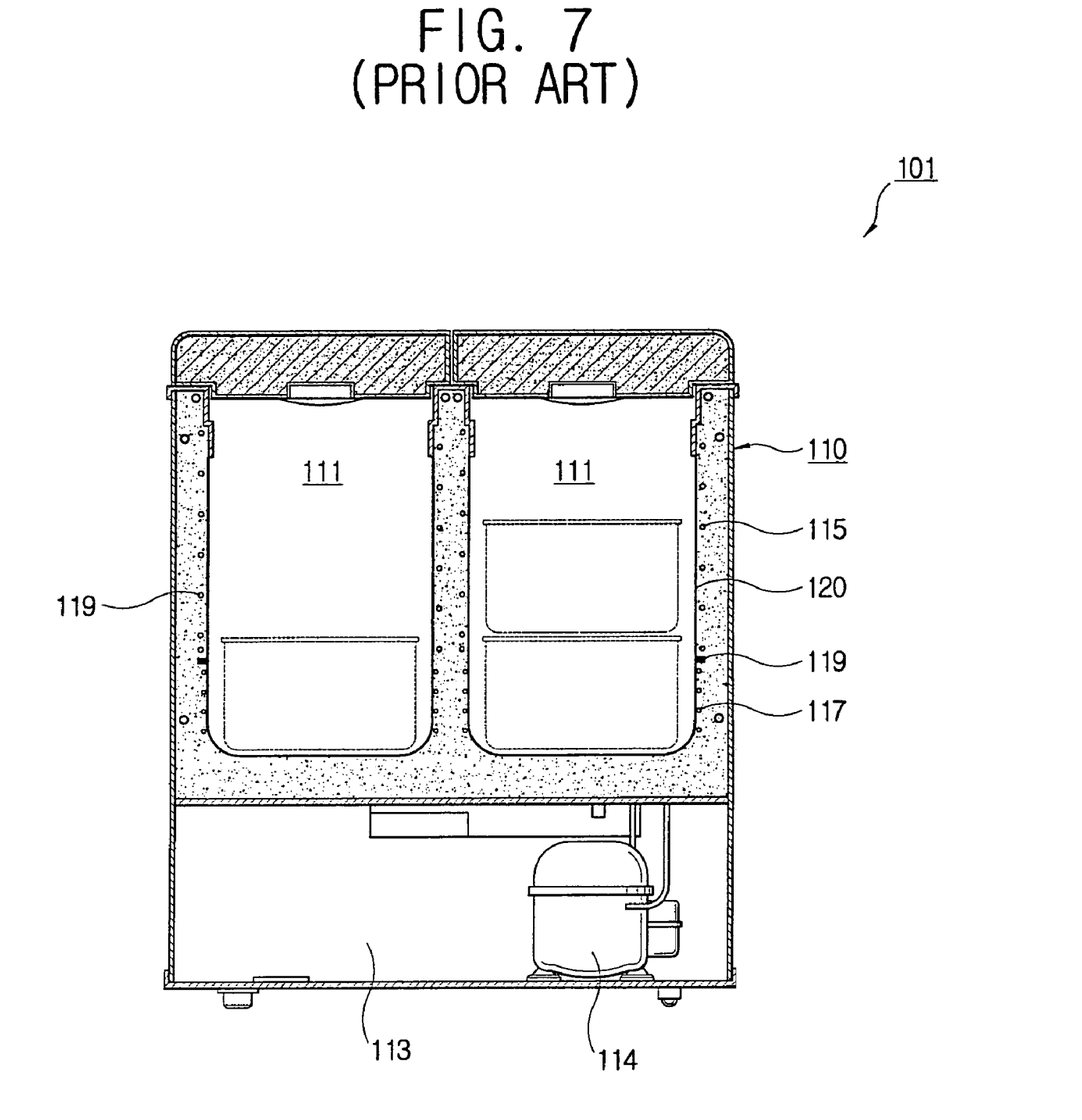
FIG. 7 is a side sectional view of a conventional kimchi refrigerator.

FIG. 7 is a side sectional view of a conventional kimchi refrigerator. As shown therein, the kimchi refrigerator is comprised of an outer casing 110 forming an outward appearance and an inner casing 120 forming a chamber 111. There is formed a space to be filled with a foaming material between the outer casing 110 and the inner casing 120. Below the chamber 111 is provided a component chamber 113.

In the space to be filled with the foaming material, which is positioned between the outer casing 110 and the inner casing 120, are installed an evaporator pipe 115 and a heater 117, to surround the inner casing 120. In the component chamber 113 are accommodated a compressor 1 14 supplying a refrigerant to an evaporator (not shown), etc.

Further, in the space to be filled with the foaming material, which is positioned between the outer casing 110 and the inner casing 120, is provided a sensor 119 sensing an inner temperature of the chamber 111 and transmitting information of the sensed temperature to a controller (not shown). The temperature sensor 119 is contacting with an outer surface of the inner casing 120 so as to sense the temperature of the chamber 111.

In this conventional kimchi refrigerator, because the temperature sensor is contacting with the outer surface of the inner casing 120 in the space for the foaming material, it is difficult to sense a real temperature inside the chamber 111, and to react promptly to a variation of the inner temperature thereof.

That is, because the temperature sensor senses the temperature of the outer surface of the inner casing to which heat from the evaporator pipe and the heater is directly transferred, a difference between a real temperature inside the chamber and the sensed surface temperature of the inner casing is created. Moreover, where a temperature is changed, for example, by adding new food to the chamber, it takes some time for the changed temperature inside the chamber to affect the temperature of the surface of the inner casing, and therefore, the temperature is neither promptly sensed by the sensor nor controlled by the controller.

In addition, because the sensor is installed in the space for the foaming material between the outer casing and the inner casing, it is impossible to repair or to replace the sensor when the sensor is out of order.

SUMMARY OF THE INVENTION

Accordingly, the present invention has been made keeping in mind the above-described shortcomings and user's need, and an object of the present invention is to control an inner temperature of a chamber by sensing a real temperature inside the chamber accurately and promptly.

This and other objects of the present invention may be accomplished by the provision of a refrigerator comprising at least one chamber and a temperature adjuster adjusting an inner temperature of the chamber, further comprising a first temperature sensor approximately sensing the temperature inside the chamber, a second temperature sensor spaced from the first temperature sensor so as to sense the real temperature inside the chamber; and a controller controlling the temperature adjuster according to the temperature sensed by the second temperature sensor when the temperature sensed by the first temperature sensor is within predetermined temperature limits of the chamber and the temperature sensed by the second temperature sensor is not within the predetermined temperature limits of the chamber.

Preferably, the first and second temperature sensors are installed at lower and upper parts of the chamber, respectively; and the controller is programmed with first and second temperature limits to be compared with the temperatures sensed by the first and second temperature sensors, respectively.

Effectively, one of the first and second temperature sensors is removably installed.

Desirably, the first temperature sensor is in contact with the bottom surface of the chamber and senses the temperature of the surface of the chamber; and the second temperature sensor is installed at the upper part of the chamber and senses the inner temperature of the chamber.

Effectively, at the upper part of the chamber are provided a sensor accommodating part accommodating the second sensor, and a sensor cover opening and closing the sensor accommodating part.

Desirably, the first and second temperature limits are different.

Effectively, the controller determines whether the temperature sensed by the first temperature sensor is within the first temperature limits, if the temperature sensed by the second temperature sensor is within the second temperature limits, to thereby control the temperature adjuster.

Preferably, the controller controls the temperature adjuster to allow the temperature sensed by the second temperature sensor to be within the second temperature limits, if the temperature sensed by the second temperature sensor is beyond the second temperature limits, and the temperature sensed by the first temperature sensor is within the first temperature limits, the temperature adjuster controls the temperature sensed by the second temperature sensor to be within the second temperature limits, thereby controlling the temperature.

Effectively, the controller controls the temperature adjuster until the temperature sensed by the second temperature sensor is within the second temperature limits, and then determines whether or not the temperature sensed by the first temperature sensor is within the first temperature limits, to thereby control the temperature adjuster.

Effectively, the refrigerator further comprises first and second sensor indicators indicating operating states of the first and second temperature sensors; and the controller controlling the operating states of the first and second temperature sensors.

Where one of the first and second temperature sensors is determined to be abnormal, the controller allows the concerned sensor indicators to indicate abnormality thereof and determines whether or not the temperature sensed by the other normal temperature sensor is within the temperature limits of the normal temperature sensor, to thereby control the temperature adjuster.

In addition, where both the first and second temperature sensors are out of order, the controller allows both the first and second sensor indicators to indicate the abnormalities of both the first and second temperature sensors, and suspends the operation of the temperature adjuster.

The temperature adjuster comprises a cooling system cooling the chamber with a compressor, a condenser, an evaporator and a valve which circulate a refrigerant; and a heater heating the chamber.

According to another aspect of the present invention, the above and other objects may be also achieved by the provision of a method for controlling a refrigerator comprising at least one chamber and a temperature adjuster adjusting an inner temperature of the chamber, comprising the steps of sensing the inner temperature of the chamber by means of first and second temperature sensors disposed at different positions; determining whether or not the temperature sensed by at least one of the first and second temperature sensors is within predetermined temperature limits of the chamber, to thereby control the temperature adjuster.

Desirably, the first and second temperature sensors are installed in lower and upper parts of the chamber, respectively; and the predetermined first and second temperature limits are compared with the temperatures sensed by the first and second temperature sensors, respectively.

Effectively, one of the first and second temperature sensors is removably installed.

Preferably, the first and second temperature limits are different.

Effectively, the method further comprises the step of determining whether the temperature sensed by the first temperature sensor is within the first temperature limits, if the temperature sensed by the second temperature sensor is within the second temperature limits, to thereby control the temperature adjuster.

The method further comprises the steps of controlling the temperature adjuster to allow the temperature sensed by the second temperature sensor to be within the second temperature limits, if the temperature sensed by the second temperature sensor is beyond the second temperature limits, and determining whether or not the temperature sensed by the first temperature sensor is within the first temperature limits, the temperature sensed by the second temperature sensor is controlled by the temperature adjuster to be within the second temperature limits.

Effectively, the method further comprises the step of controlling the temperature adjuster until the temperature sensed by the second temperature sensor is within the second temperature limits, and then determining whether or not the temperature sensed by the first temperature sensor is within the first temperature limits, to thereby control the temperature adjuster.

Preferably, the method further comprises the step of checking operating states of the first and second temperature sensors and indicating the operating state of the first and the second temperature sensors by means of the first and the second sensor indicators.

Desirably, the method further comprises the step of allowing the concerned sensor indicators to indicate abnormality thereof where one of the first and second temperature sensors is determined to be abnormal, and determining whether or not the temperature sensed by the other normal temperature sensor is within the temperature limits of the normal temperature sensor, to thereby control the temperature adjuster.

Effectively, the method further comprises the step of allowing both the first and second sensor indicators to indicate the abnormalities of both the first and second temperature sensors, and suspending the operation of the temperature adjuster, where both the first and second temperature sensors are out of order.

At this time, the temperature adjuster comprises a cooling system cooling the chamber with a compressor, a condenser, an evaporator and a valve which circulate a refrigerant; and a heater heating the chamber.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 5a through 5d is a flow chart of controlling the kimchi refrigerator according to the present invention in a cooling mode.

FIG. 6a through 6d is a flow chart of controlling the kimchi refrigerator according to the present invention in a ripening mode.

DETAILED DESCRIPTION OF THE PREFERRED EMBODIMENT

A preferred embodiment of the present invention will be described in more detail with reference to the accompanying drawings.

Figure 1:
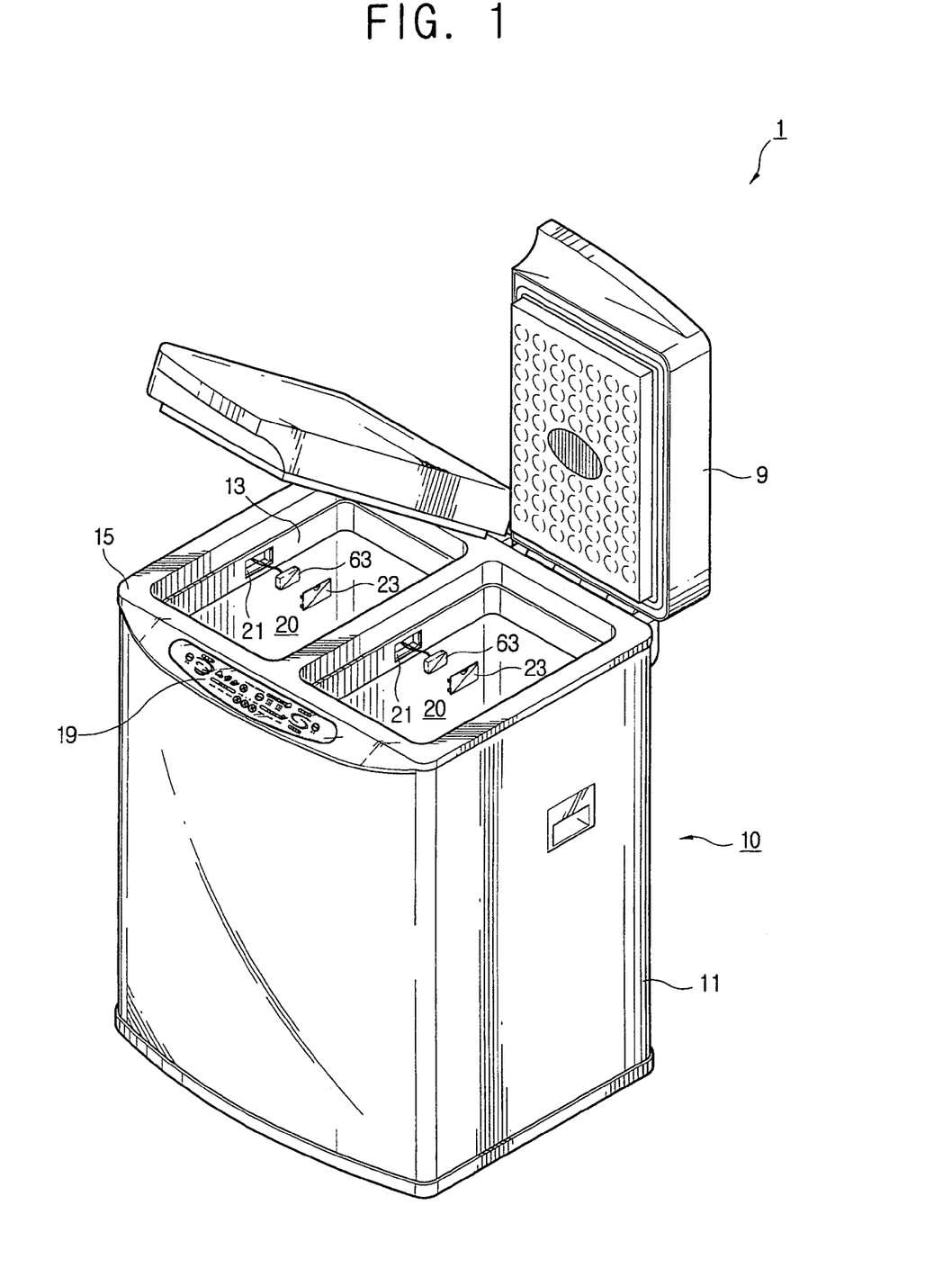
FIG. 1 is a perspective view of a kimchi refrigerator according to the present invention.
Figure 2:
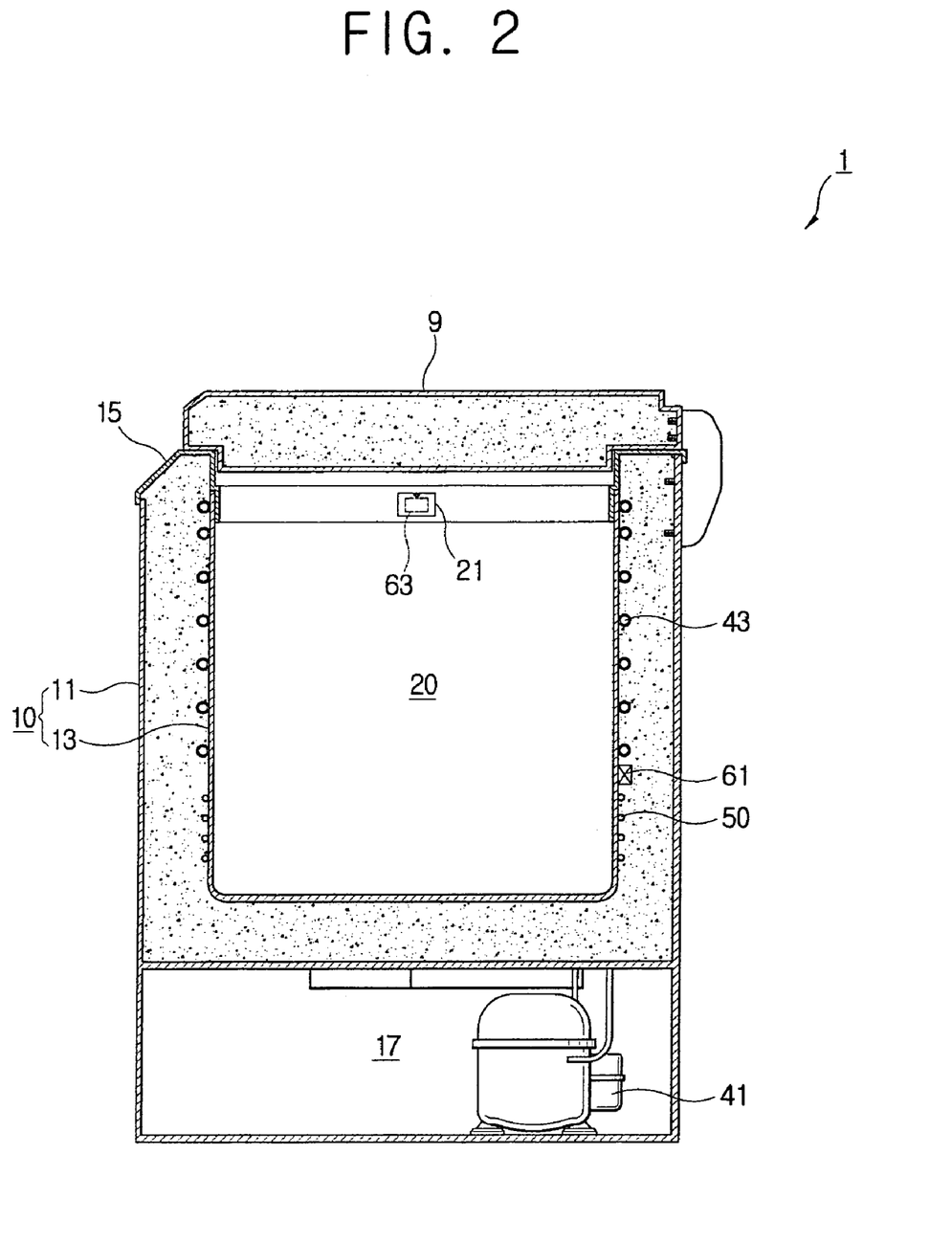
FIG. 2 is a side sectional view of the kimchi refrigerator of FIG. 1.

Referring to FIGS. 1 and 2, a kimchi refrigerator 1 includes a main body 10 provided with a pair of chambers 20, and doors 9 with hingedly coupled to the top part of the main body 10 opening and closing the chambers 20.

The main body 10 is comprised of an outer casing 11 forming an outward appearance, an inner casing 13 forming each chamber 20, and a top cover 15 forming a top opening of each chamber 20 on the top part of the main body 10. There is formed a space to be filled with a foaming material between the outer casing 11 and the inner casing 13. Below the chamber 20 is provided a component chamber 17.

In the main body 10 is provided a temperature adjuster 5 (FIG. 4) adjusting a temperature inside the chamber 20, a sensor 60 sensing the temperature inside the chamber 20, a controller 70 (FIG. 4) controlling operation modes and the temperature adjuster 5 based on the temperature inside the chamber 20 sensed by the sensor 60, and a power supplying part 80 (FIG. 4) supplying electric power to the respective components. And, in front of the top cover 15 of the main body 10 is provided a control panel 19 allowing a user to select the operation mode of the kimchi refrigerator 1 or to check an operation state thereof.

The temperature adjuster 5 comprises a cooling system 40 (FIG. 4) cooling the chamber 20 to have a predetermined cooling temperature, and a heater 50 heating the chamber 20 to have a predetermined ripening temperature.

Figure 4:
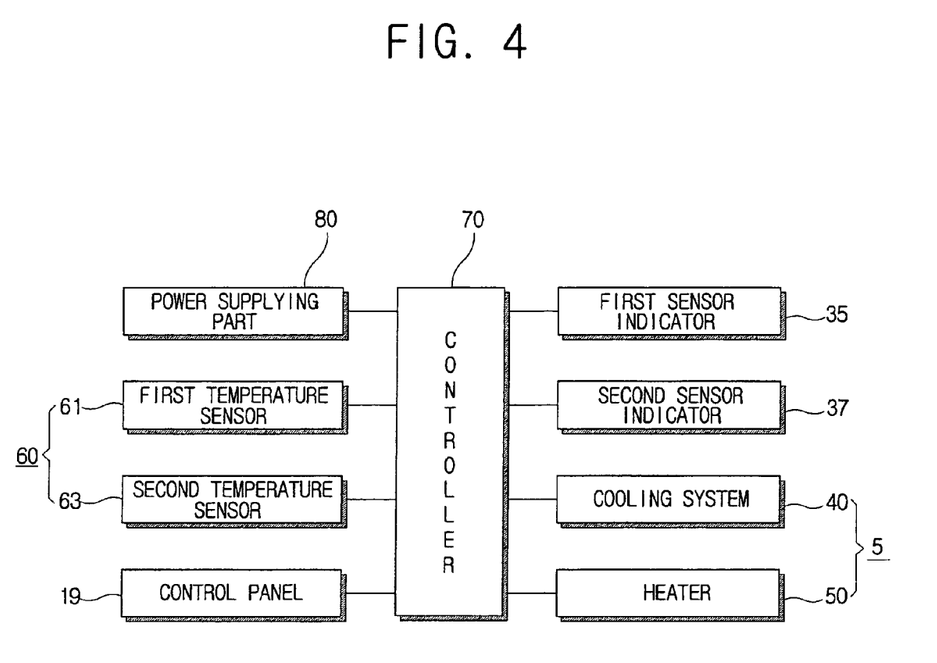
FIG. 4 is a control block diagram of the kimchi refrigerator according to the present invention.
Figure 5A:
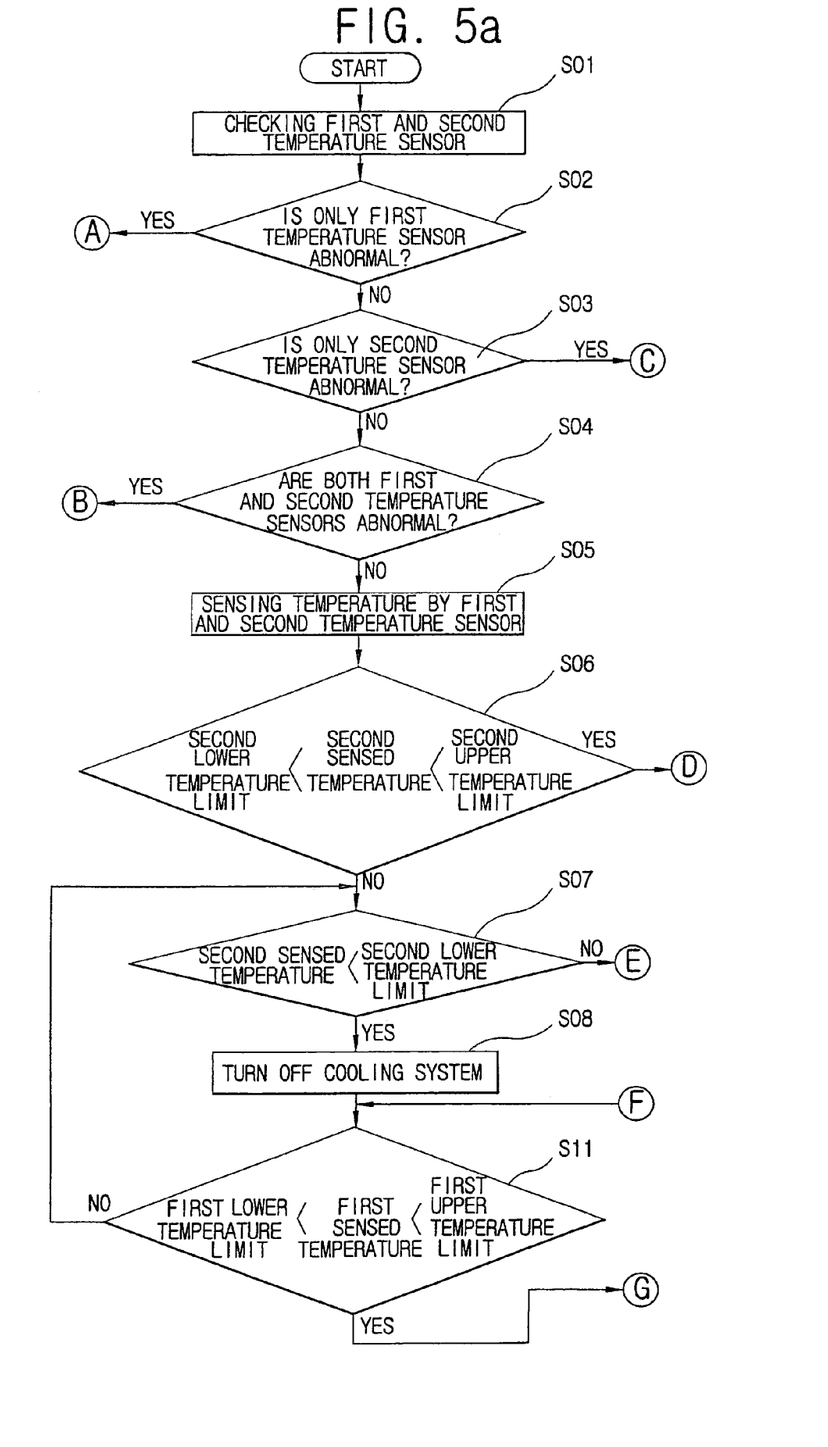
Figure 5B:
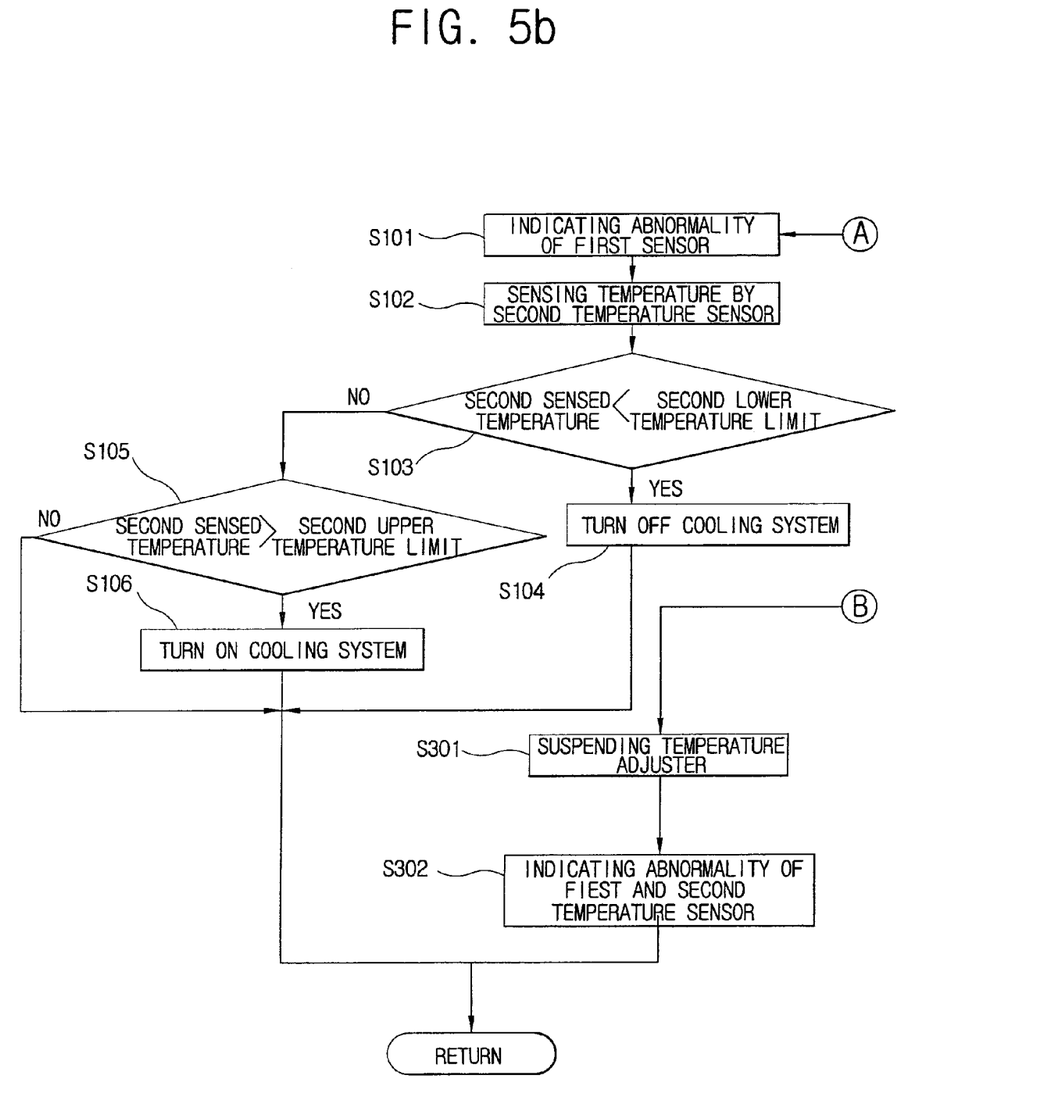
Figure 5C:
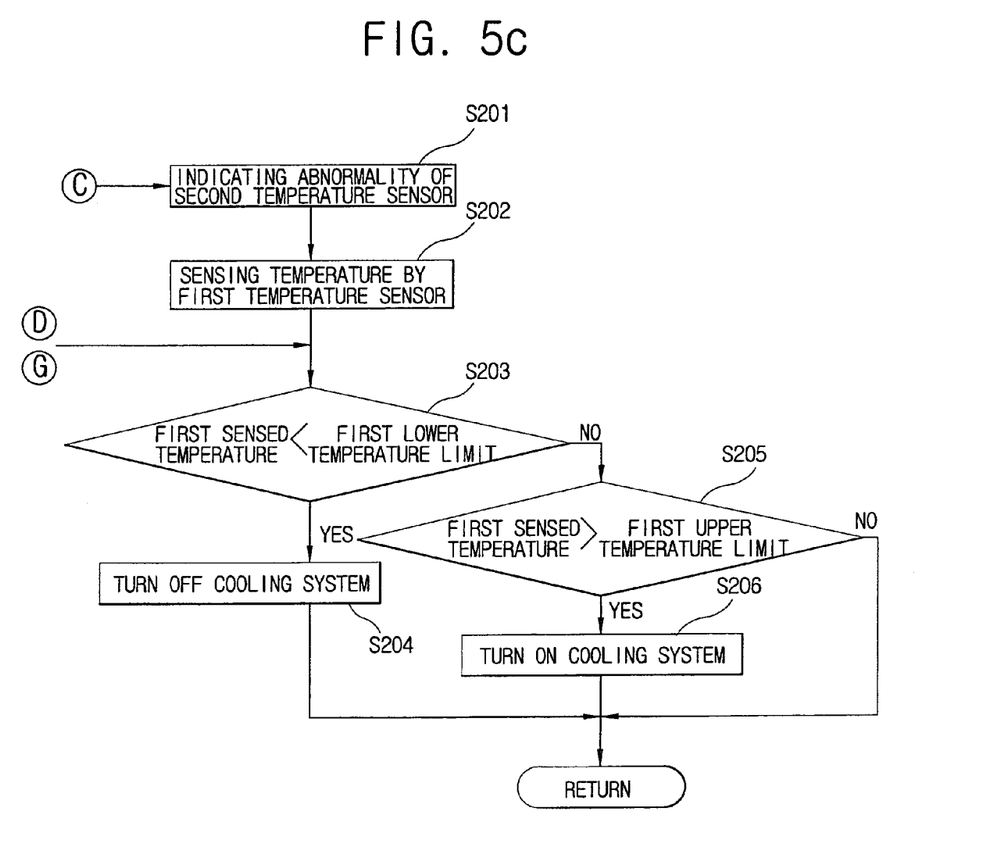
Figure 5D:
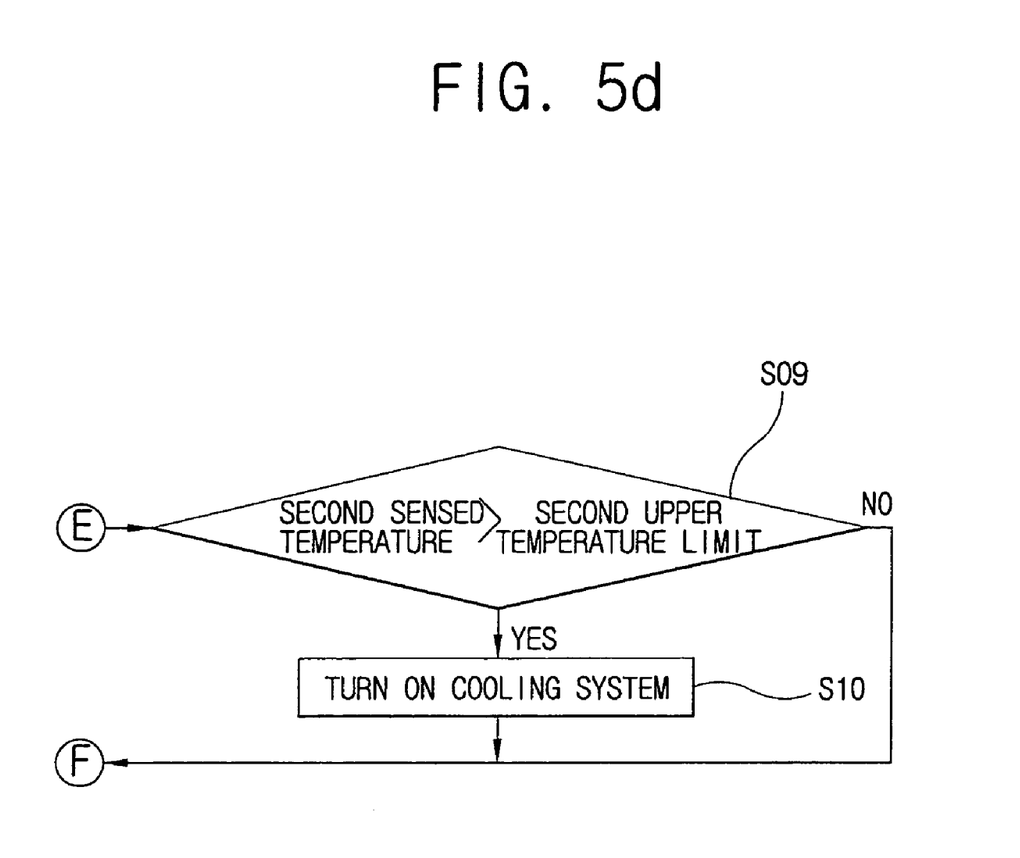
Figure 6A:
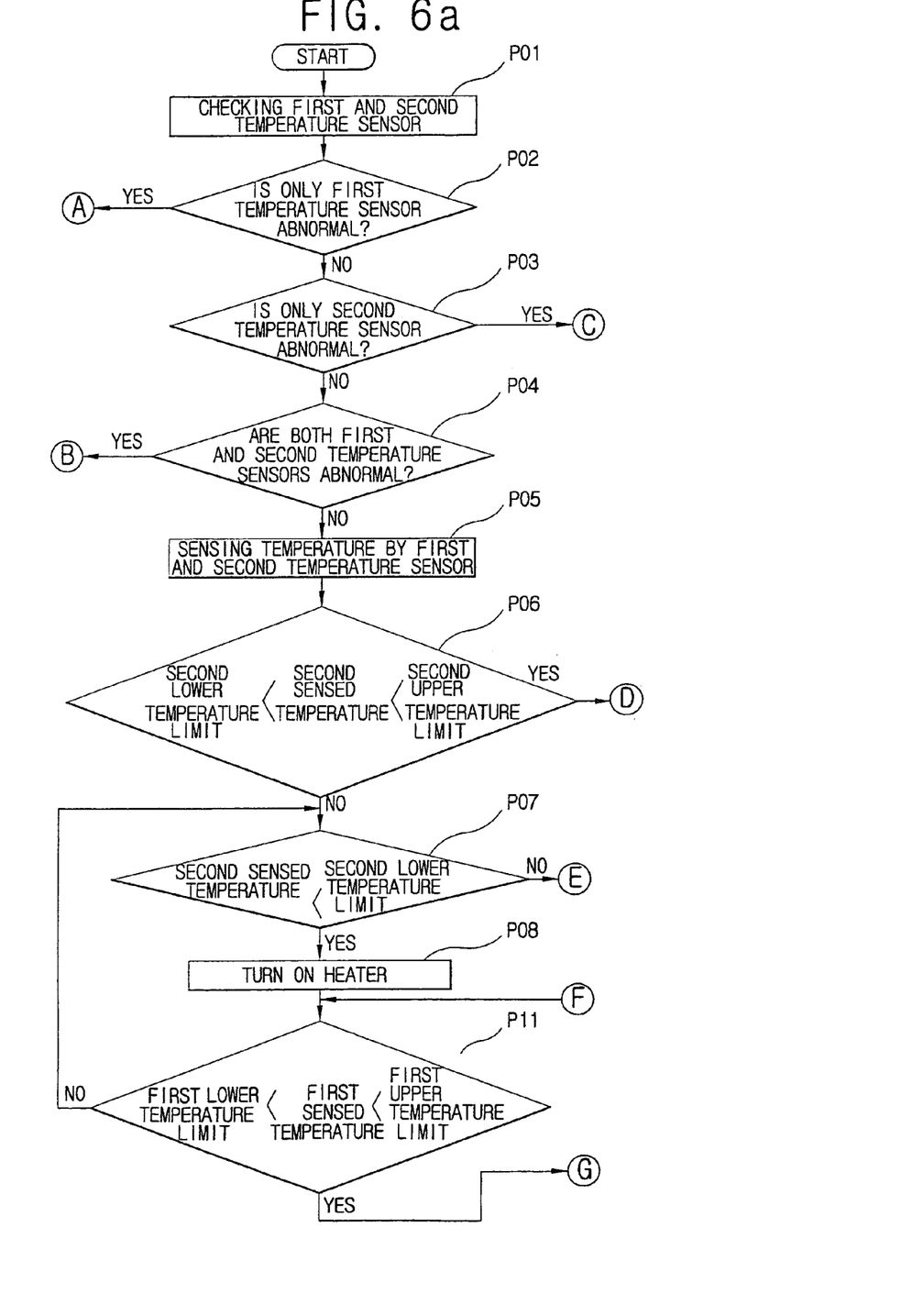
Figure 6B:
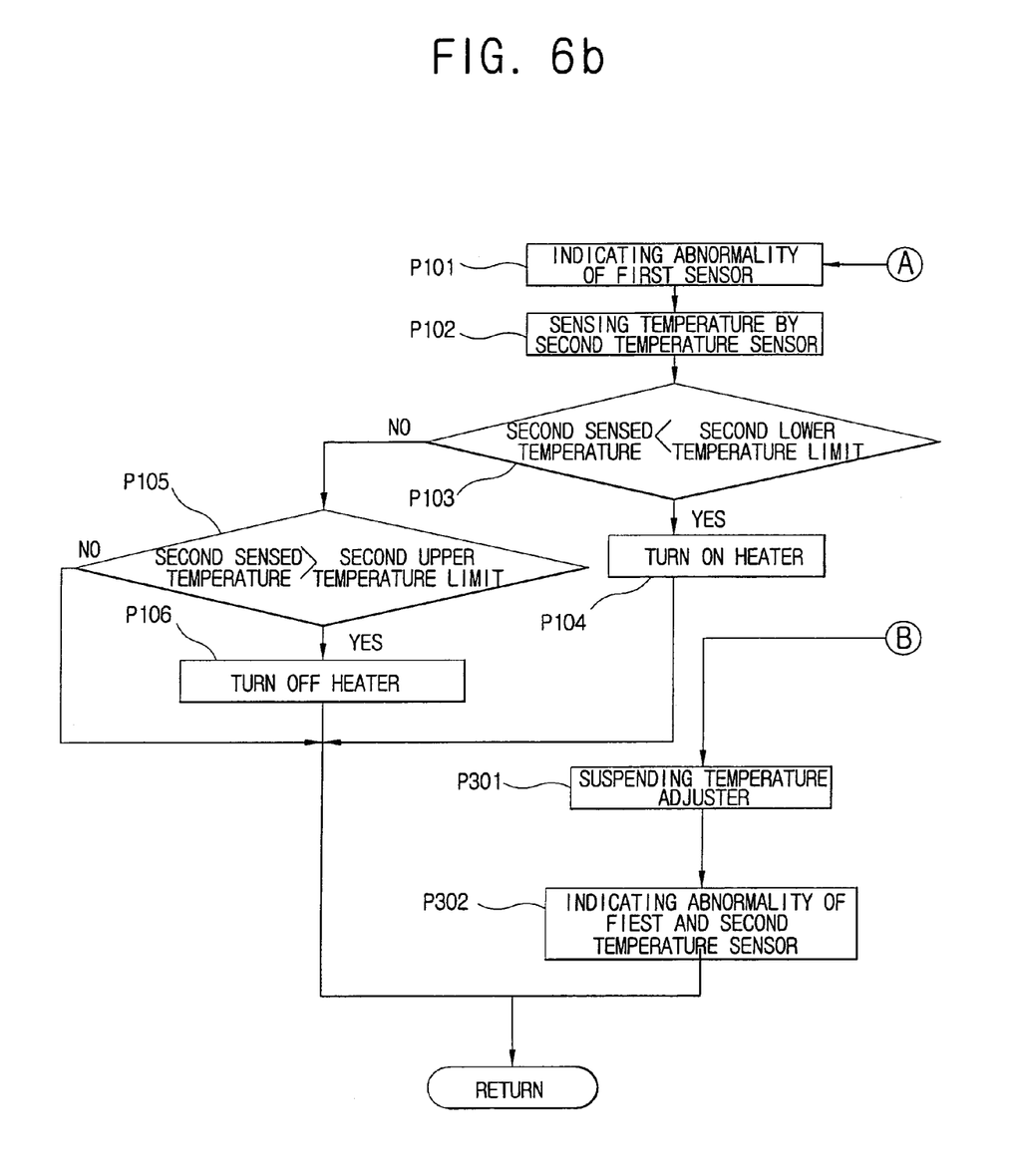
Figure 6C:
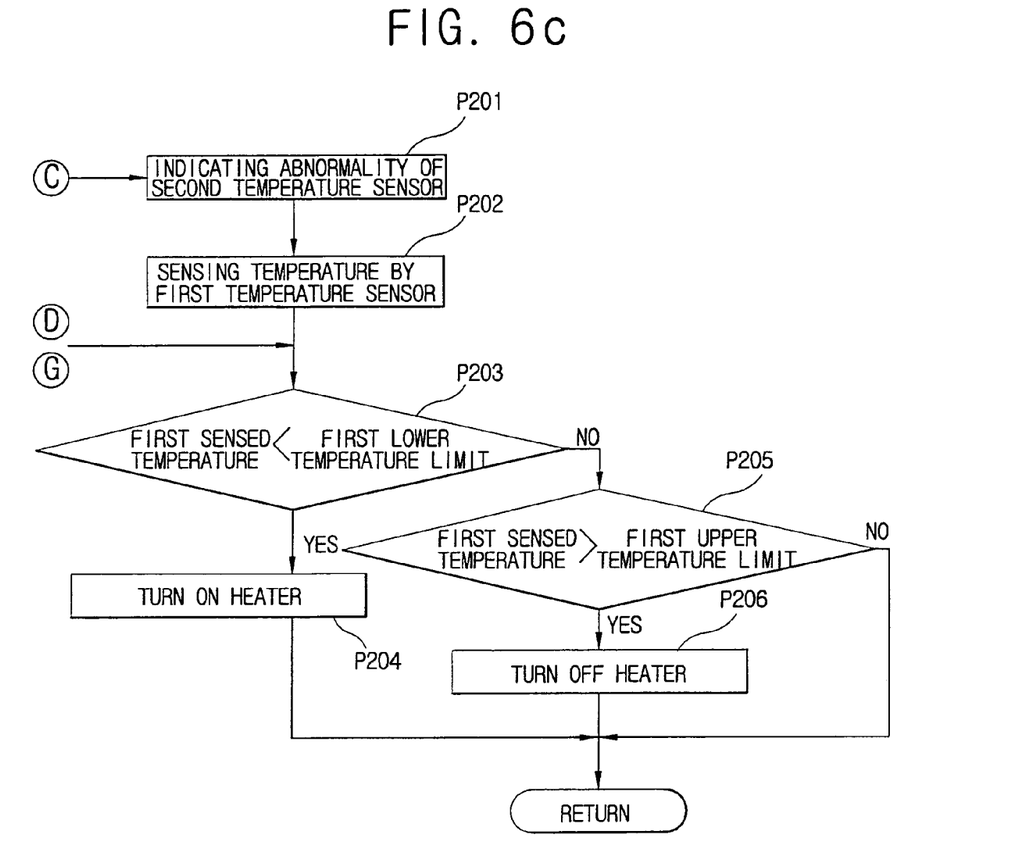
Figure 6D:
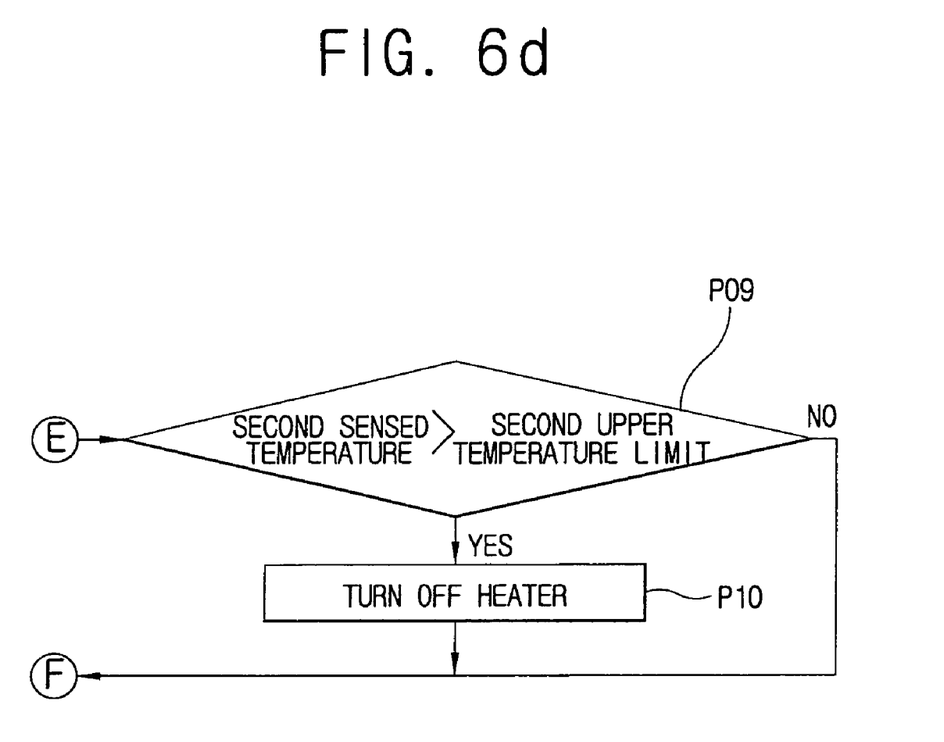

The cooling system 40 is comprised of a compressor 41 installed in the component chamber 17, a condenser 42 condensing a refrigerant from the compressor 41, an evaporator 43 cooling the chamber 20 by evaporating the refrigerant from the condenser 42 a valve 44 adjusting the amount of the refrigerant supplied to the evaporator 43 from the compressor 41, etc.

Here, the evaporator 43 has a pipe shape and surrounds an outside surface of the inner casing 13 forming each chamber 20 in the space for the foaming material.

The heater 50 also surrounds the outside surface of the inner casing 13 like the evaporator 43.

The temperature sensor 60 includes a first temperature sensor 61 sensing a temperature at a lower part of the chamber 20, and a second temperature sensor 63 sensing a temperature at an upper part of the chamber.

The first temperature sensor 61 is installed in the space for the foaming material between the inner casing 13 and the outer casing 11, contacting with the outside surface of the inner casing 13. The second temperature sensor 63 senses the real temperature inside a central region of the chamber 20, accommodated in a sensor accommodating part 21 of the top cover 15.

Here, the sensor accommodating part 21 can be opened and closed by a sensor cover 23, and therefore it is possible to repair or to replace the second temperature sensor 63.

Figure 3:
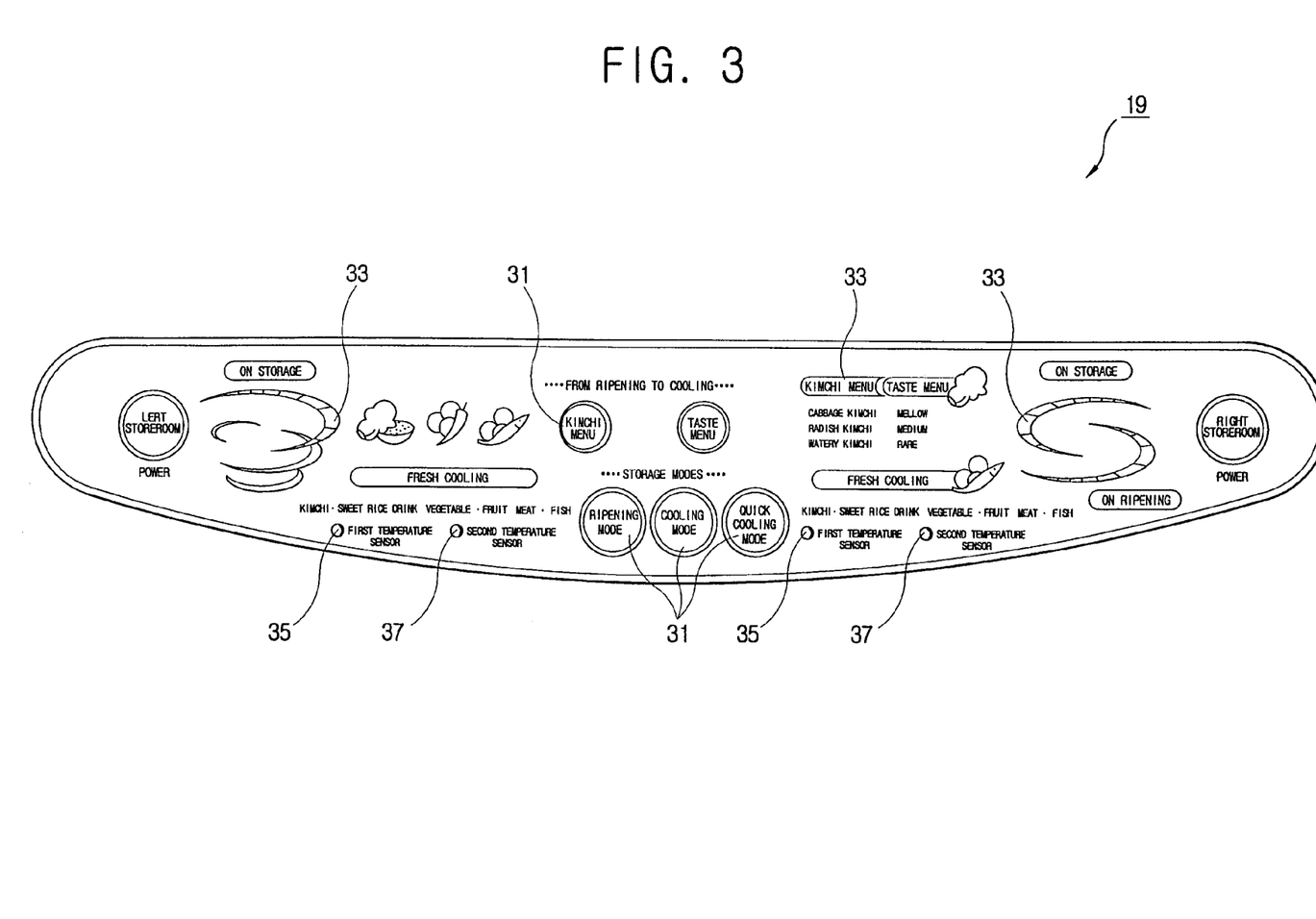
FIG. 3 is a front plan view of a control panel of the kimchi refrigerator in FIGS. 1 and 2.

Referring to FIG. 3, in the control panel 19 are provided a plurality of operation selecting buttons 31 allowing a user to select an operation mode of the chamber 20, an operation indicator 33 showing an operation state of the chamber 20, and first and second sensor indicators 35 and 37 indicating a normality or an abnormality of the first and second temperature sensors 61 and 63.

The first and second sensor indicators 35 and 37 may, as shown in FIG. 3, be made of luminous devices emitting various colors of light or auditory devices generating a warning signal so as to indicate a normality or an abnormality of the first and second temperature sensors 61 and 63.

Referring to FIG. 4, the controller 70 compares temperatures of the chamber 20 sensed by the first and second temperature sensors 61 and 63 with a predetermined set up temperature within temperature limits under a cooling mode or a ripening mode, and controls the cooling system 40 or the heater 50 in order to accurately and promptly keep the inner temperature of the chamber 20 being within the temperature limits of each operating mode.

Here, the temperature limits according to the predetermined set up operation mode programmed into the controller 70 are set on the basis of the central region of the chamber 20. In this case, the temperature limits of the first and second temperature sensors 61 and 63 may be equal or different from each other, according to installation positions thereof.

For example, the temperature limits of the first temperature sensor 61 maybe smaller than the temperature limits of the second temperature sensor 63 sensing a real change of the inner temperature of the chamber 20 more quickly. In this case, the inner temperature of the chamber 20 is adjusted by controlling the temperature adjuster 5 on the basis of the temperature limits of the first temperature sensor 61 if the inner temperature of the chamber 20 is within the temperature limits of the second temperature sensor 63, after controlling the temperature adjuster 5 with the inner temperature of the chamber 20 sensed by the second temperature sensor 63. Accordingly, the inner temperature of the chamber 20 can be effectively controlled by sensing quickly and accurately a change thereof.

During the operation of the kimchi refrigerator 1, if one of the first and second temperature sensors 61 and 63 is out of order, the controller 70 allows one of the first and second sensor indicators 35 and 37 to indicate the abnormality of the first or second temperature sensor 61 or 63, and simultaneously controls the temperature adjuster 5 based on information of the temperature transmitted from the other normal senor 61 or 63. If both of the sensors 61 and 63 are out of order, the controller 70 allows both of them 35 and 37 to indicate the abnormality of the temperature sensors 61 and 63, and simultaneously suspends the operation of the temperature adjuster 5.

Referring to FIG. 5a through 5d, if the kimchi refrigerator 1 starts the cooling mode, the controller 70 activates the first and second temperature sensors 61 and 63 (S01), and determines whether only the first temperature sensor 61 is abnormal (S02), or only the second temperature sensor 61 is abnormal (S03), or both of the sensors 61 and 63 are abnormal (S04) in sequence.

In step S02, if abnormality of only the first temperature sensor 61 is determined, the controller 70 indicates that the first temperature sensor 61 is out of order, and controls the inner temperature of the chamber 20 using only the second temperature sensor 63.

That is, the controller 70 allows the first sensor indicator 35 to indicate the abnormality of the first temperature sensor 61 (S101), and allows the second temperature sensor 63 to sense the inner temperature of the chamber 20 (S102). Next, the controller 70 compares the inner temperature of the chamber 20 sensed by the second temperature sensor 63 with a second lower temperature limit (S103), and prevents the inner temperature of the chamber 20 from lowering below the second lower temperature limit by turning off the cooling system 40 such as the compressor 41, the valve 44 etc., if the inner temperature of the chamber 20 sensed by the second temperature sensor 63 is lower than the second lower temperature limit (S104).

Next, the controller 70 compares the inner temperature of the chamber 20 sensed by the second temperature sensor 63 with the second lower temperature limit (S103). Then, the controller 70 determines whether the inner temperature of the chamber 20 sensed by the second temperature sensor 63 is higher than a second upper temperature limit, if the inner temperature of the chamber 20 sensed by the second temperature sensor 63 is higher than the second lower temperature limit (S105). If the inner temperature of the chamber 20 is higher than the second upper temperature limit, the controller 70 prevents the inner temperature of the chamber 20 from raising above the second upper temperature limit by turning on the cooling system 40 such as the compressor 41, the valve 44, etc. (S106).

Thereafter, the controller 70 returns the procedure for controlling the temperature to the step of S01. Accordingly, though the first temperature sensor 61 is out of order, the second temperature sensor 63 can uniformly maintain the inner temperature of the chamber 20.

If the first temperature sensor 61 is normal in the step of S02 and the second temperature sensor 63 is abnormal in the step of S03, the controller 70 controls the abnormality of the second temperature sensor 63 to be indicated, and controls the inner temperature of the chamber 20 with only the first temperature sensor 61.

That is, the controller 70 allows the second sensor indicator 37 to indicate the abnormality of the second temperature sensor 63 (S201), and allows the first temperature sensor 61 to sense the inner temperature of the chamber 20 (S202). Next, the controller 70 compares the inner temperature of the chamber 20 sensed by the first temperature sensor 61 with a first lower temperature limit (S203), and prevents the inner temperature of the chamber 20 from lowering below the first lower temperature limit by turning off the cooling system 40 such as the compressor 41, the valve 44 etc , if the inner temperature of the chamber 20 sensed by the first temperature sensor 61 is lower than the first lower temperature limit (S204).

The controller 70 compares the inner temperature of the chamber 20 sensed by the first temperature sensor 61 with the first lower temperature limit (S203). The controller 70 determines whether the inner temperature of the chamber 20 sensed by the first temperature sensor 61 is higher then a first upper temperature limit, if the inner temperature of the chamber 20 sensed by the first temperature sensor 61 is higher than the first lower temperature limit (S205). If the inner temperature of the chamber 20 is higher than the first upper temperature limit, the controller 70 prevents the inner temperature of the chamber 20 from raising above the second upper temperature limit by turning on the cooling system 40 such as the compressor 41, the valve 44, etc. (S206).

Thereafter, the controller 70 returns the procedure for controlling the temperature to the step of S01. Accordingly, though the second temperature sensor 63 is out of order, the first temperature sensor 61 can uniformly maintain the inner temperature of the chamber 20. Here, in the step of S03, if the abnormality of the second temperature sensor 63 is determined, a user can replace or repair the second temperature sensor 63. In this case, a service engineer opens the sensor cover 23 of the sensor accommodating part 21, and repairs or replaces the second temperature sensor 63.

If it is determined that both the first and second temperature sensors 61 and 63 are abnormal in the step of S04 through the steps of S02 and S03, the controller 70 cuts off electric power supplied to the temperature adjuster 5 of the main body 10 from the power supplying part 80, thereby suspending the temperature adjuster 5 (S301). Next, the controller 70 allows the first and second sensor indicators 35 and 37 to indicate the abnormalities of the first and second temperature sensors 61 and 63 (S302), and warns a user that the kimchi refrigerator 1 is unsuitable to use. Thus, when the first and second temperature sensors 61 and 63 are out of order, the controller 70 keeps the kimchi refrigerator 1 from operating, to thereby previously prevent damages of the components of the temperature sensor 5 due to overloading.

Oppositely, if it is determined that both the first and second temperature sensors 61 and 63 are normal in the step of S04 through the steps of S02 and S03, the controller allows the first and the second temperature sensors 61 and 63 to sense the temperatures of the chamber 20 (S05). Next, the controller determines whether the inner temperature of the chamber 20 sensed by the second temperature sensor 63 is between the second upper temperature limit and the second lower temperature limit (S06). That is, the inner temperature of the chamber 20 sensed by the second temperature sensor 63 is compared with the second upper and lower temperature limits.

In order to determine whether the inner temperature of the chamber 20 sensed by the second temperature sensor 63 is beyond the second temperature limits, the controller 70 compares the inner temperature of the chamber 20 sensed by the second temperature sensor 63 with the second lower temperature limit (S07), and prevents the inner temperature of the chamber 20 from lowering below the second lower temperature limit by turning off the cooling system 40 such as the compressor 41, the valve 44 etc., if the inner temperature of the chamber 20 sensed by the second temperature sensor 63 is lower than the second lower temperature limit (S08).

Then, the controller 70 compares the inner temperature of the chamber 20 sensed by the second temperature sensor 63 with the second lower temperature limit (S07), and then determines whether the inner temperature of the chamber 20 sensed by the second temperature sensor 63 is higher than the second upper temperature limit, if the inner temperature of the chamber 20 sensed by the second temperature sensor 63 is higher than the second upper temperature limit (S09). If the inner temperature of the chamber 20 is higher than the second upper temperature limit, the controller 70 prevents the inner temperature of the chamber 20 from raising above the second upper temperature limit by turning on the cooling system 40 such as the compressor 41, the valve 44, etc. (S10).

In this manner, the controller 70 determines whether the inner temperature of the chamber 20 sensed by the first temperature sensor 61 is within the first temperature limits, in other words, between the first lower temperature limit and first upper temperature limit (S11). If the inner temperature of the chamber 20 sensed by the first temperature sensor 61 is beyond the first temperature limits, the controller 70 repeats the procedure for controlling the temperature from the step of S07 to S11.

Next, if the inner temperature of the chamber 20 sensed by the first temperature sensor 61 is within the first temperature limits in the step of S11, the controller 70 moves the procedure to the step of S203, and controls the inner temperature of the chamber 20 by means of the first temperature sensor 61. That is, the controller 70 controls the cooling system 40 based on the real temperature inside the chamber 20 sensed by the second temperature sensor 63, and therefore accurately and promptly keeps the inner temperature of the chamber 20 under the cooling mode.

If the inner temperature of the chamber 20 sensed by the second temperature sensor 63 is the equal to the second upper or lower temperature limit in the step of 506, the controller 70 determines that the inner temperature of the chamber 20 is stable, and controls the inner temperature of the chamber 20 by means of the first temperature sensor 61 after moving to the step of S203. That is, if the inner temperature of the chamber 20 sensed by the second temperature sensor 63 is equal to the second upper or lower temperature limit in the step of S06, the controller 70 compares the inner temperature of the chamber 20 sensed by the first temperature sensor 61 with the first lower temperature limit. If the inner temperature of the chamber 20 sensed by the first temperature sensor 61 is lower than the first lower temperature limit (S203), the controller 70 turns off the cooling system 40 such as the compressor 41 and/or the valve 44, and prevents the inner temperature of the chamber 20 from lowering below the first lower temperature limit (S204).

Then, the controller 70 compares the inner temperature of the chamber 20 sensed by the first temperature sensor 61 with the first lower temperature limit in the step of S203, and then compares the inner temperature of the chamber 20 sensed by the first temperature sensor 61 with the first upper temperature limit, if the inner temperature of the chamber 20 sensed by the first temperature sensor 61 is higher than the first upper temperature limit (S205). If the inner temperature of the chamber 20 is higher than the first upper temperature limit, the controller 70 prevents the inner temperature of the chamber 20 from raising above the first upper temperature limit by turning on the cooling system 40 such as the compressor 41 and/or the valve 44, etc. (S206). Thereafter, the controller 70 returns the procedure for controlling the temperature to the step of S01. Thus, it is possible to accurately and promptly keep the inner temperature of the chamber 20 under the cooling mode.

The kimchi refrigerator according to the present invention, as shown in FIG. 6a through 6d, can quickly and exactly control the inner temperature of the chamber 20 by means of the first and second temperature sensors 61 and 63 under the ripening mode as well. At this time, the procedure for controlling the temperature under the ripening mode is equivalent to the procedure of the cooling mode in FIG. 5a through 5d except that the heater 50 is turned on at the steps of P08, P103 and P203, and turned off at the steps of P10, P106 and P206. Here, the temperature limits are predetermined to the ripening mode.

Further, the kimchi refrigerator according to the present invention can also quickly and exactly control the inner temperature of the chamber 20 in the case that the ripening mode and the cooling mode are switched alternately, following the procedures for controlling the temperature in FIGS. 5 and 6.

Thus, the inner temperature of the chamber can be effectively controlled by driving the temperature adjuster, depending upon comparing the predetermined upper and lower temperature limits with the temperature sensed by at least one of the first and second temperature sensors, the first and second temperature sensors being disposed in different positions, and sense the inner temperature of the chamber. Also, if one of the sensors is abnormal, the other sensor controls the temperature adjuster. Where the second temperature sensor is out of order, it is possible to replace and repair the second temperature sensor.

The present invention is not limited only to the above-mentioned embodiment, but it also goes without saying that the present invention is applied to various refrigerators.

As above described, the inner temperature of the chamber is effectively controlled by accurately and promptly sensing the real temperature inside the chamber. Even if one of the first and second temperature sensors is out of order, it is possible to replace or repair the abnormal temperature sensor, or to control the temperature adjuster by means of the other normal temperature sensor.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A refrigerator comprising:
   at least one chamber;
   a first temperature sensor arranged to sense a temperature of the chamber;
   a second temperature sensor spaced from the first temperature sensor to sense an inner temperature of the chamber;
   a temperature configured to adjust adjusting the inner temperature of the chamber; and
   a controller configured to control the temperature adjuster according to the temperature sensed by the second temperature sensor when the temperature sensed by the first temperature sensor is within a predetermined temperature range of the chamber and the temperature sensed by the second temperature sensor is not within the predetermined temperature range of the chamber.

2. The refrigerator according to claim 1, wherein the first and second temperature sensors are installed at lower and upper parts of the chamber, respectively; and
   the controller is programmed with said predetermined temperature range, said predetermined temperature range comprising a first temperature range and a second temperature range to be compared with the temperatures sensed by the first and second temperature sensors, respectively.

3. The refrigerator according to claim 2, wherein one of the first and second temperature sensors is removably installed.

4. The refrigerator according to claim 2, wherein the first and second temperature ranges are different from each other.

5. The refrigerator according to claim 4, wherein the controller determines whether the temperature sensed by the first temperature sensor is within the first temperature range, if the temperature sensed by the second temperature sensor is within the second temperature range, to thereby control the temperature adjuster.

6. The refrigerator according to claim 5, wherein the controller controls the temperature adjuster to allow the temperature sensed by the second temperature sensor to be within the second temperature range if the temperature sensed by the second temperature sensor is not within the second temperature range, and determines whether or not the temperature sensed by the first temperature sensor is within the first temperature range, if the temperature sensed by the second temperature sensor is within the second temperature range, to thereby control the temperature adjuster.

7. The refrigerator according to claim 4, wherein the controller controls the temperature adjuster until the temperature sensed by the second temperature sensor is within the second temperature range, and then determines whether or not the temperature sensed by the first temperature sensor is within the first temperature range, to thereby control the temperature adjuster.

8. The refrigerator according to claim 7, wherein the controller controls the temperature adjuster to allow the temperature sensed by the second temperature sensor to be within the second temperature range, if the temperature sensed by the second temperature sensor is not within the second temperature range, and determines whether or not the temperature sensed by the first temperature sensor is within the first temperature range, if the temperature sensed by the second temperature sensor is within the second temperature range, to thereby control the temperature adjuster.

9. The refrigerator according to claim 7, wherein the controller controls the temperature adjuster until the temperature sensed by the second temperature sensor is within the second temperature range, and then determines whether or not the temperature sensed by the first temperature sensor is within the first temperature range, to thereby control the temperature adjuster.

10. The refrigerator according to claim 7, wherein where both the first and second temperature sensors are out of order, the controller allows both the first and second sensor indicators to indicate the abnormalities of both the first and second temperature sensors, and suspends the operation of the temperature adjuster.

11. The refrigerator according to claim 1, wherein one of the first and second temperature sensors is removably installed.

12. The refrigerator according to claim 11, wherein the first temperature sensor is in contact with the bottom surface of the chamber and senses the temperature of the surface of the chamber; and
  the second temperature sensor is installed at the upper part of the chamber and senses the inner temperature of the chamber.

13. The refrigerator according to claim 12, further comprising a sensor accommodating part accommodating the second temperature sensor, and a sensor cover opening and closing the sensor accommodating part.

14. The refrigerator according to claim 13, further comprising first and second sensor indicators indicating operating states of the first and second temperature sensors; and
  wherein the controller controls the operating states of the first and second temperature sensors.

15. The refrigerator according to claim 14, wherein where one of the first and second temperature sensors is determined to be abnormal and the other of the first and second temperature sensors is determined to be normal, the controller allows the sensor indicator corresponding to the abnormal sensor to indicate abnormality and determines whether or not the temperature sensed by the normal temperature sensor is within the temperature range of the normal temperature sensor, to thereby control the temperature adjuster.

16. The refrigerator according to claim 1, wherein the temperature adjuster comprises:
  a cooling system cooling the chamber with a compressor, a condenser, an evaporator and a valve which circulate a refrigerant; and
  a heater heating the chamber.

17. A refrigerator comprising:
  at least one chamber;
  a first temperature sensor being in contact with the bottom surface of the chamber to sense the temperature of the bottom surface of the chamber;
  a second temperature sensor spaced from the first temperature sensor to sense an inner temperature of the chamber;
  a temperature adjuster adjusting the inner temperature of the chamber; and
  a controller controlling the temperature adjuster according to the temperature sensed by the second temperature sensor when the temperature sensed by the first temperature sensor is within a predetermined temperature range of the chamber and the temperature sensed by the second temperature sensor is not within the predetermined temperature range of the chamber.

18. The refrigerator according to claim 17, further comprising a sensor accommodating part accommodating the second temperature sensor, and a sensor cover opening and closing the sensor accommodating part.

19. A refrigerator comprising:
  at least one chamber;
  a first temperature sensor arranged to sense a temperature of a surface of the chamber;
  a second temperature sensor spaced from the first temperature sensor to sense an inner temperature of the chamber;
  a temperature adjuster configured to adjust the inner temperature of the chamber; and
  a controller programmed with a first predetermined temperature range and a second predetermined temperature range, the controller configured to control the temperature adjuster based on a determination of whether the temperature sensed by the first temperature sensor is within said first predetermined temperature range and whether the temperature sensed by the second temperature sensor is within said second predetermined temperature range.

20. The refrigerator according to claim 19, wherein the controller controls said temperature adjuster based on the temperature sensed by the second temperature sensor until the temperature sensed by the second temperature sensor is within said second predetermined temperature range, and, once said temperature sensed by the second temperature sensor is within said second predetermined temperature range, the controller controls said temperature adjuster based on said temperature sensed by the first temperature sensor until said temperature sensed by the first temperature sensor is within said first predetermined temperature range.

21. The refrigerator according to claim 19, wherein the temperature adjuster comprises a cooling system to cool the chamber and a heater to heat the chamber, and if the temperature sensed by the second temperature sensor is not within said second predetermined temperature range, the controller turns off said cooler and turns on said heater when the temperature sensed by the second temperature sensor is lower than said second predetermined temperature range, and turns on said cooler and turns off said heater when the temperature sensed by the second temperature sensor is higher than said second predetermined temperature range, and if the temperature sensed by the second temperature sensor is within said second predetermined temperature range, the controller turns off said cooler and turns on said heater when the temperature sensed by the first temperature sensor is lower than said first predetermined temperature range, and turns on said cooler and turns off said heater when the temperature sensed by the first temperature sensor is higher than said first predetermined temperature range.

22. The refrigerator according to claim 21, further comprising a sensor accommodating part accommodating the second temperature sensor, and a sensor cover opening and closing the sensor accommodating part.

* * * * *